US012612974B2

(12) United States Patent
Cardwell et al.

(10) Patent No.: US 12,612,974 B2
(45) Date of Patent: Apr. 28, 2026

(54) STACKED VALVE ASSEMBLY

(71) Applicant: Cooper-Standard Automotive Inc.,
Northville, MI (US)

(72) Inventors: Brian James Cardwell, Ypsilanti, MI
(US); Matthew J. Klenk, Commerce
Township, MI (US)

(73) Assignee: Cooper-Standard Automotive Inc.,
Northville, MI (US)

( * ) Notice: Subject to any disclaimer, the term of this
patent is extended or adjusted under 35
U.S.C. 154(b) by 167 days.

(21) Appl. No.: 18/389,471

(22) Filed: Nov. 14, 2023

(65) Prior Publication Data

US 2025/0155034 A1 May 15, 2025

(51) Int. Cl.
| | |
|---|---|
| *F16K 11/085* | (2006.01) |
| *F16K 27/06* | (2006.01) |
| *F16K 31/04* | (2006.01) |
| *F16K 31/53* | (2006.01) |
| *F16K 41/02* | (2006.01) |

(52) U.S. Cl.
CPC ........ *F16K 11/0853* (2013.01); *F16K 27/065*
(2013.01); *F16K 31/041* (2013.01); *F16K*
*31/535* (2013.01); *F16K 41/026* (2013.01)

(58) Field of Classification Search
CPC .. F16K 11/0853; F16K 11/166; F16K 11/165;
F16K 11/0856
See application file for complete search history.

(56) References Cited

U.S. PATENT DOCUMENTS

| | | | |
|---|---|---|---|
| 6,240,941 B1 | 6/2001 | Small et al. | |
| 9,657,861 B2 * | 5/2017 | Enomoto | F16K 31/04 |
| 11,002,375 B2 | 5/2021 | Marchand et al. | |
| 2007/0215223 A1 | 9/2007 | Morris | |
| 2013/0048084 A1 * | 2/2013 | Bartnick | F16K 11/165 |
| | | | 137/870 |

* cited by examiner

*Primary Examiner* — Michael R Reid
(74) *Attorney, Agent, or Firm* — Paschall & Associates,
LLC; James C. Paschall; Anthony Miologos

(57) ABSTRACT

An apparatus and method of stacked valves that selectively
move the stacked valves into various switched positions
using a single actuator. A first valve of the valve stack is
movable into one or more switched positions by an actuator
that drives the first valve in a first or a second direction for
a first or a second distance. Second and third valves of the
valve stack are selectively movable into one or more
switched positions by motion transfer stages. The motion
transfer stages selectively transfer the first or second direc-
tion and the first or second distance movements of the first
valve to the second and third valves that place the second
and third valves into one of the switched positions.

12 Claims, 9 Drawing Sheets

STACKED VALVE ASSEMBLY

TECHNICAL FIELD

This disclosure is generally directed to fluid valves and more particularly to a stacked valve assembly and a method for operating such a stacked valve assembly.

BACKGROUND

There is currently a limited range of choices that have been developed to meet the needs for the increased complexity of thermal management for liquid cooling electrified vehicles (EV). EV and hybrid vehicles require more complicated cooling arrangements due to the additional cooling required of batteries, motors, and power electronics. EVs currently have limited customer adoption and market acceptance which keeps their production volumes fairly low. Low volumes drive the need for solutions that are "configurable" in nature to allow the same set of sub-components to be able to be utilized in a variety of different end-items. For example, standard multi-way ball valves are available, but are bulky and relatively expensive to manufacture due to the precision required to create a fluid-tight seals within and between the valves. In order to maintain a fluid-tight seal in such valves, standard multi-way valves must be produced as a single unit. This limits the utility of standard multi-way valves since a valve arrangement must be created for each different application. Additionally, in such ball valve arrangements a plurality of actuators and control signal cables are required in order to manipulate each valve individually, which further increases the complexity of such an apparatus.

The present disclosure provides a stacked valve assembly which overcomes these issues by providing an apparatus and method for operating multiple valves of the stacked valve assembly driven by a single actuator that can be placed in various combinations of positions of individual valves contained in the stack.

SUMMARY

This disclosure relates to an apparatus containing a stack of valves and a method for operating multiple valves using a single actuator that places the valves contained in the stack in various switched positions.

In a first embodiment, an apparatus is disclosed comprising a first valve having at least one input port and at least one output port. The first valve is movable into at least one of a plurality of switched positions. A drive section is coupled to the first valve and is arranged to move the first valve into at least one of the plurality of switched positions. The apparatus further includes a second valve that has at least one input port and at least one output port and movable into at least one of a plurality of switched positions. A first tab is coupled to the first valve and the second tab is coupled to the second valve. Movement of the first valve by the drive section engages the first tab with the second tab causing the movement of the second valve into one of the plurality of switched positions.

In a second embodiment a stacked valve system is disclosed comprising a first valve having at least one input port and at least one output port movable into at least one of a plurality of switched positions. The system further includes a drive section coupled to the first valve and an actuator coupled to the drive section, the actuator arranged to move the drive section and the first valve into at least one of the plurality of switched positions. A second valve having at least one input port and at least one output port is movable into at least one of a plurality of switched positions. A motion transfer stage located between the first valve and the second valve is arranged to transfer the movement of the first valve to the second valve, wherein the moving of the first valve by the actuator causes movement of the second valve into one of the plurality of switched positions.

In a third embodiment a method is disclosed that operates to place an apparatus of stacked valves each having at least one input port and at least one output port into one of a plurality of switched positions. The method comprises moving a first valve using an actuator, the actuator applying a selected movement to the first valve that places the first valve into one of the plurality of switched positions and that couples the selective movement of the first valve to a transfer stage. The transfer stage couples the selective movement to a second valve that places the second valve into one of the plurality of switched positions.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
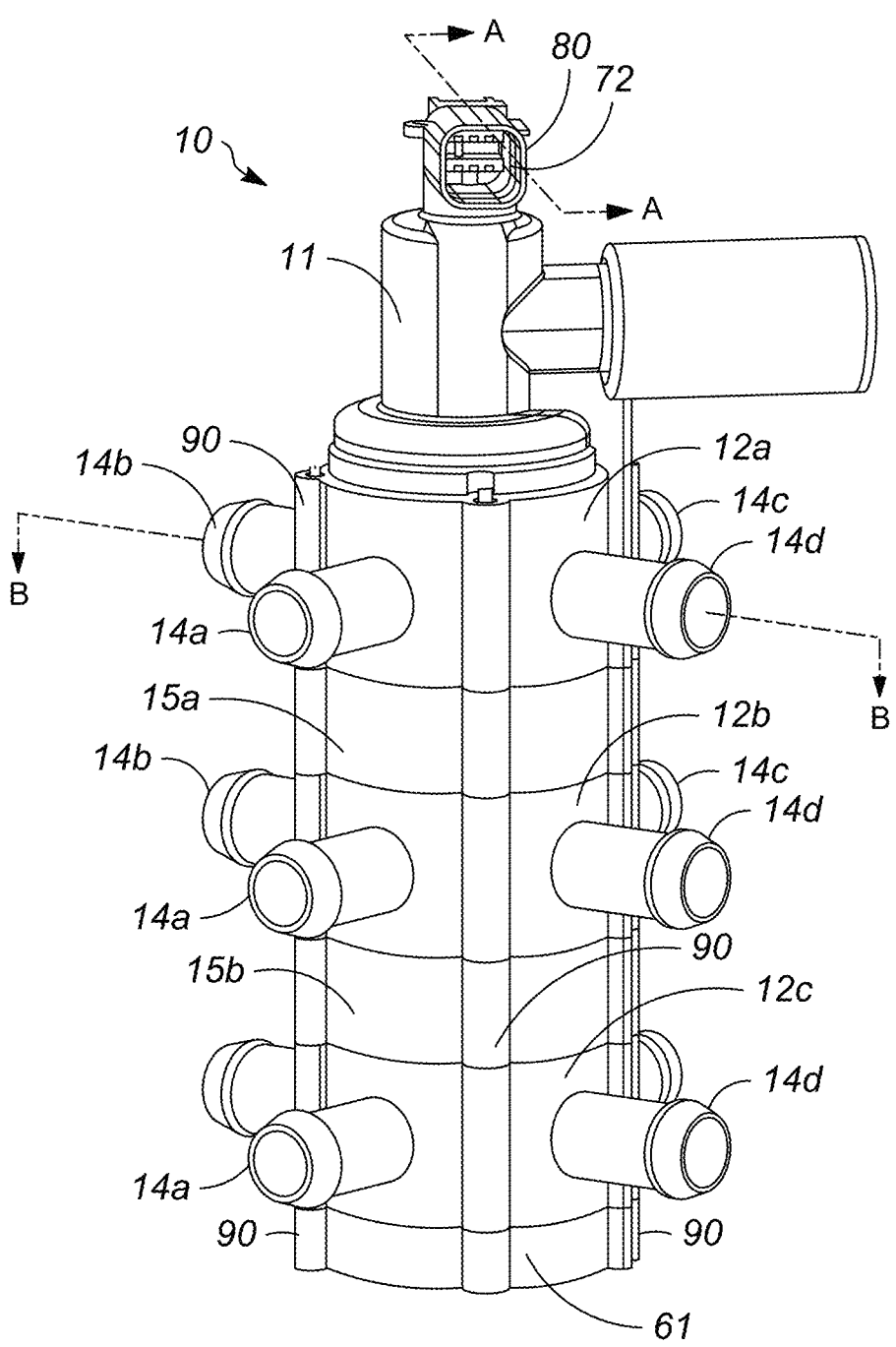
FIG. 1 is a perspective representation of one embodiment of a stacked valve assembly formed in accordance with the present invention.

The figures discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The stacked valve assembly of the present disclosure uses a modular vertically or horizontally stacked geometry containing three or less separate valves. Each valve is fluidically isolated from the other valve of the assembly and are stacked between a drive section on one end containing an actuator motor used to position the valves and a bearing cap on an end opposite the drive section.

Each valve may contain a standard 2 port, 3 port, or 4 port valve body with equal geometries. In this disclosure, a 4-port valve body will be used in the explanation of the stacked valve assembly. A first valve of the stacked valve assembly is driven by an actuator and all subsequent valves in the assembly have a tab driven by a disc located in a motion transfer stage that interacts with a neighboring disc via an associated tab. It will be appreciated by those skilled in the art that other devices, such as pins, teeth, notches, or other similar driving and driven parts may be used to cause transfer of movement from one valve to another valve by the motion transfer stage.

The first valve is rotated by the actuator motor in a first direction by up to two complete rotations causing the tabs of the adjoining valve discs to engage each other. The first arrangement of valve positions is established when the rotation stops after the initial two rotations. A second arrangement of valve positions is made by rotating the actuator in a second opposite direction by a greater than one (>1) rotation. A third arrangement of valve positions is made by turning the actuator in the first direction by a less than one (<1) rotation.

With reference to FIGS. 1-5, a stacked valve assembly 10, is shown suitable for the switching of coolant fluid through one or more coolant circuits of a vehicle. This may be of particular use in an EV vehicle, where cooling fluid may need to be diverted between many different systems, such as the battery, drive train, cabin heater, etc., during operation of the EV.

The stacked valve assembly 10 comprises a first, a second and a third valves 12a, 12b, and 12c axially aligned with each other. Each valve is self-contained and fluidically separated from its neighboring valve in the stack. Each valve 12a, 12b and 12c has a plurality of fluid ports extending from the exterior surface of a valve housing. In an embodiment of the present disclosure, each valve 12a, 12b and 12c has ports 14a, 14b, 14c and 14d extending in a cross-like pattern from its respective valve housing. Each port 14a, 14b, 14c and 14d may act as an input port that may be attached to a pipeline supplying coolant from a vehicle's cooling circuits or an output port dispensing fluid from the valve via a pipeline to the cooling circuits. In an embodiment of the present disclosure, the ports are configured in pairs with each pair comprising an input port and an output port positioned 90 degrees to the other. Ports 14a and 14d make up the first pair of ports with port 14d acting as the input port and 14a acting as the output port. Similarly, a second pair of ports for each valve includes ports 14c and 14b with port 14b acting as the input port and the 14c as the output port.

Figure 4:
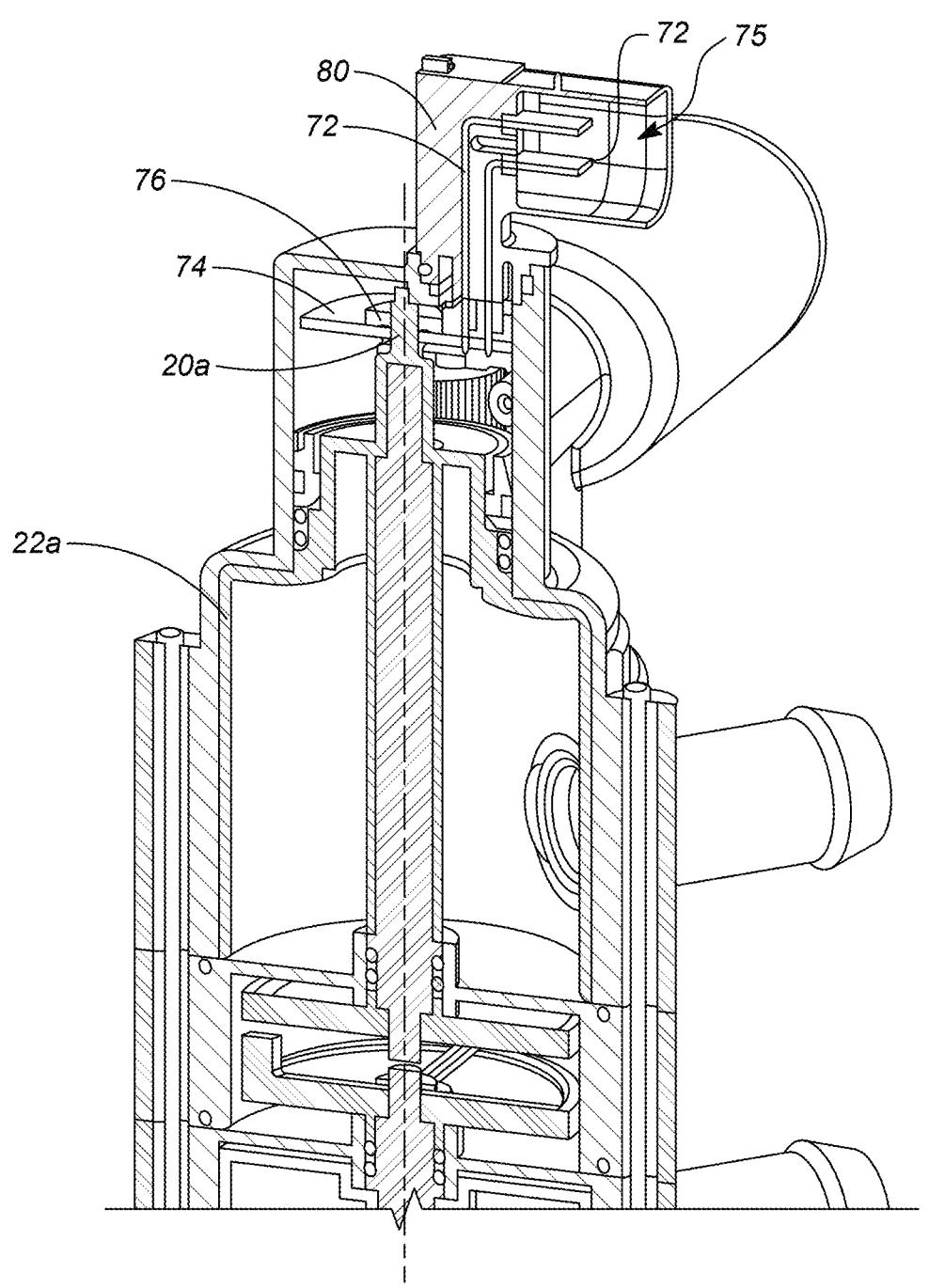
FIG. 4 is a cross-section perspective representation of the connector housing of the stacked valve assembly taken through line A-A of FIG. 1.
Figure 5:
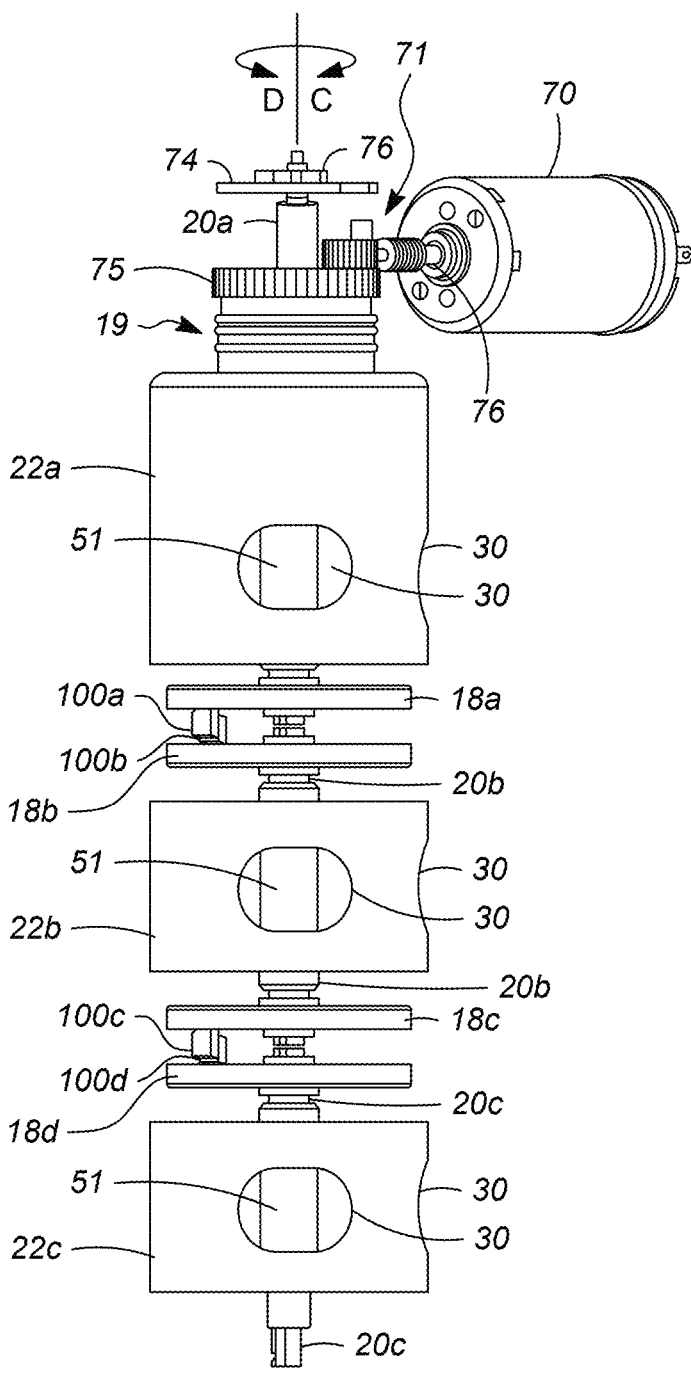
FIG. 5 is a perspective representation of the alignment between the drive section, the switching chambers of the valves and discs of the motion transfer stages having their outer housings not shown for clarity.

The stacked valve assembly 10 further includes a drive section housing 11 that extends axially from one end of the housing of the first valve 12a. As shown in FIGS. 4 and 5, the drive section housing 11 contains an actuator motor 70, a drive sub-assembly 71, an electrical circuit board 74 and a position sensor 76. The drive section housing 11 further includes a connector housing 80 having electrical terminals 72 contained within the connector housing 80 arranged to accept and electrically couple terminals 72 to a suitable electrical connector (not shown).

Figure 2:
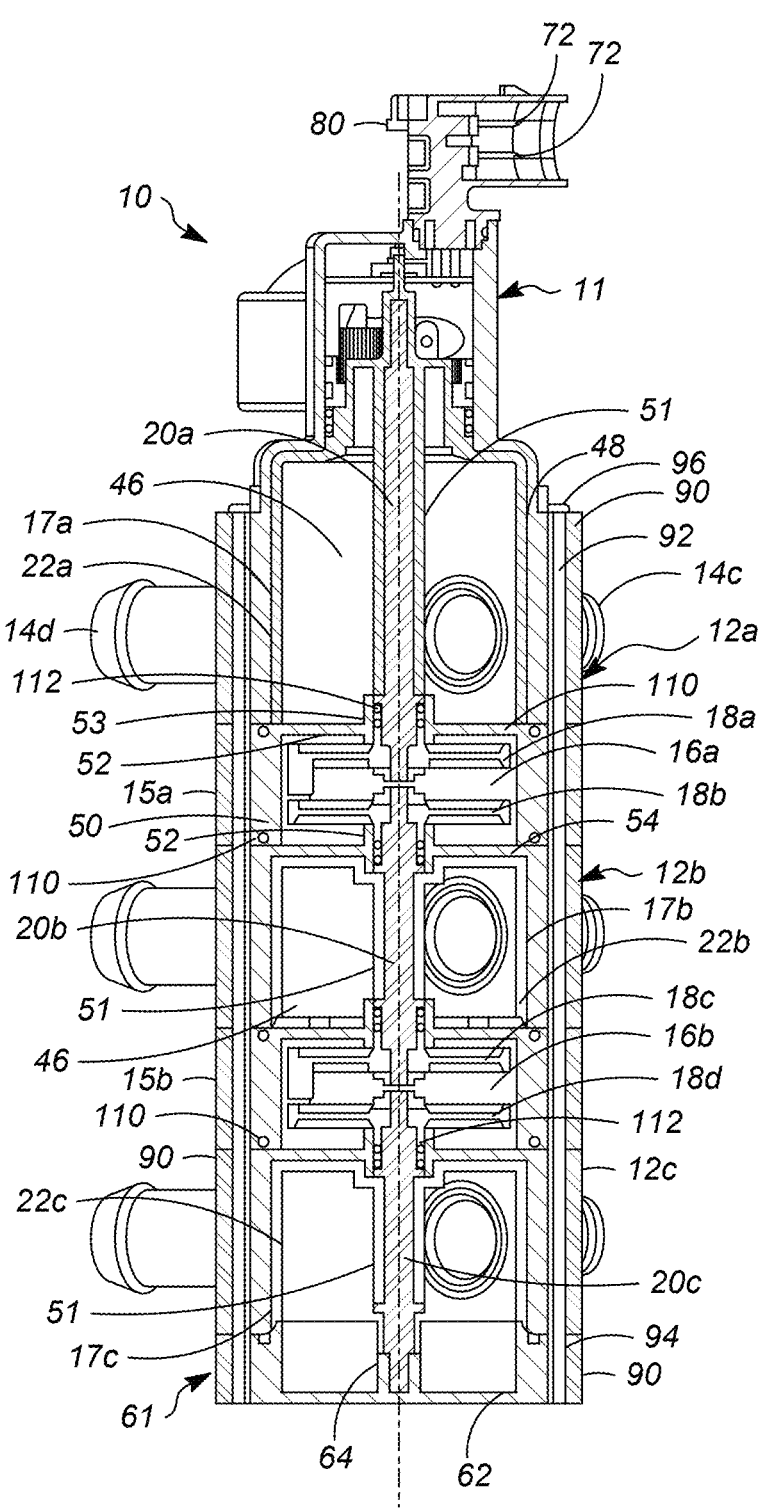
FIG. 2 is a cross-section through the stacked valve assembly of FIG. 1 taken through line A-A.

With reference to FIGS. 1 and 2, the stacked valve assembly 10 further includes first and second motion transfer stages 15a and 15b. The first motion transfer stage 15a has a housing that axially aligns with the housing of the first valve 12a and the housing of the second valve 12b and which is located between the housing of the first valve 12a and the housing of the second valve 12b. The second motion transfer stage 15b also has a housing that axially aligns with the housing of the second valve 12b and the housing of the third valve 12c. The second motion transfer stage 15b is located between the housing of the second valve 12b and the housing of the third valve 12c. Each motion transfer stage 15a and 15b includes a cylindrical cavity 16 defined by an annular wall 50 and a ceiling 52. A centrally located bearing member 53 extends through the ceiling 52.

An end cap housing 61 is attached to the housing of the third valve 12c. The end cap housing 61 has a floor 62 having a centrally located bearing member 64 extending from the floor 62.

The housings of valves 12a, 12b and 12c and the housings of each motion transfer stage 15a and 15b and end cap 61 includes four mounting bosses 90 equidistantly spaced from each other along the exterior of the housings of valves 12a, 12b and 12c, the housings of the motion transfer stages 15a and 15b and the end cap housing 61. An internal smooth bore 92 is located in each valve and motion transfer stage mounting boss that aligns with its neighbor to form an axial bore through the stacked valve assembly 10. The end cap housing 61 mounting bosses have a threaded bore 94 that engage threaded fasteners 96 inserted through each internal smooth bore 92 of the neighboring valve and motion transfer stage. The threaded fasteners 96 retain the stacked assembly 10 together when inserted through the internal bores 92 to threadedly engage the threaded bores 94.

Figure 3:
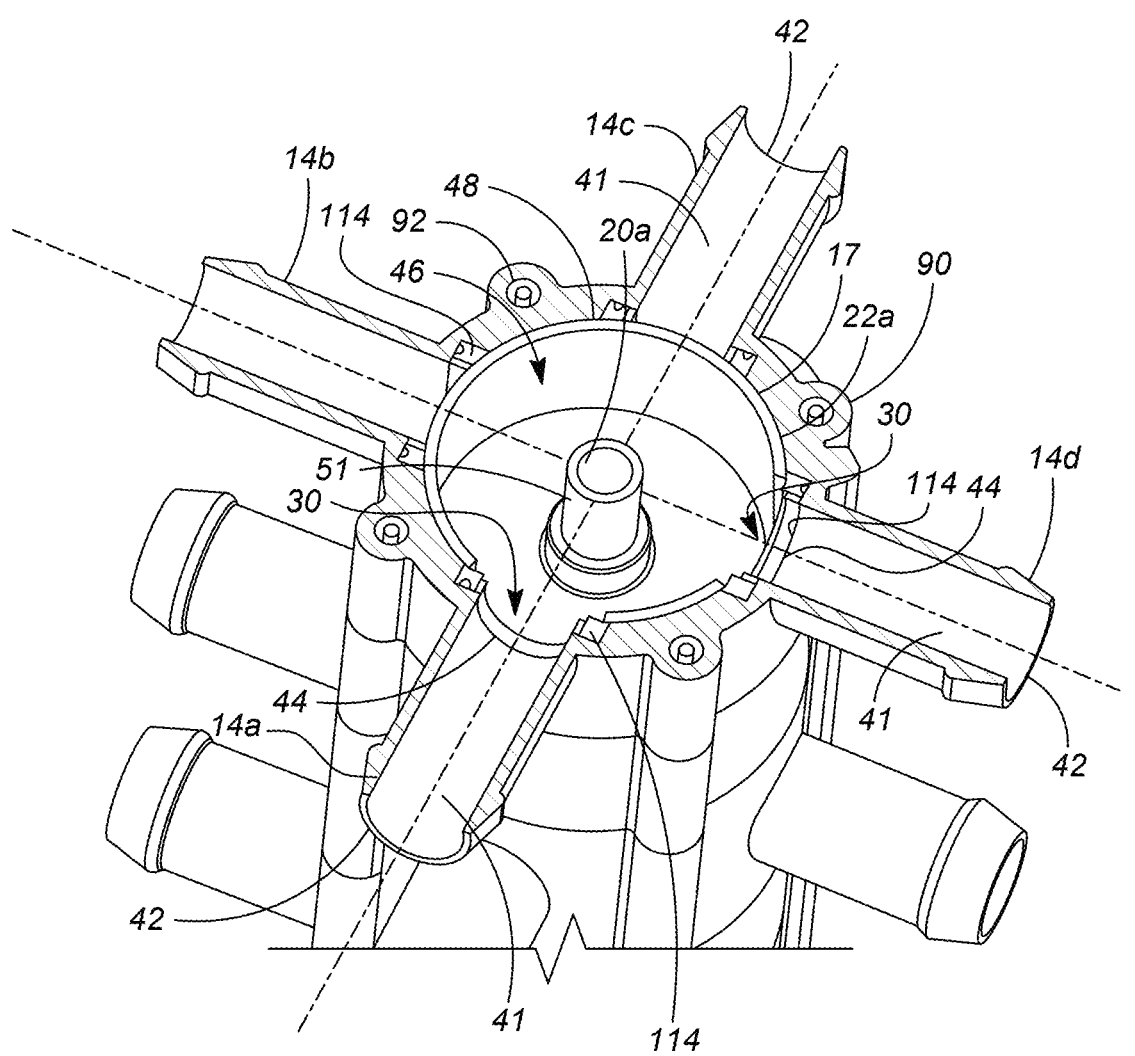
FIG. 3 is a cross-section perspective representation of a valve taken through line B-B of the stacked valve assembly of FIG. 1.

Ports 14a, 14b, 14c and 14d as shown in FIG. 3 each include a passage 41 leading from an opening 42 on one end of each port to an opening 44 extending through an interior wall 17 of a respective first, second and third valve 12a, 12b and 12c, respectively. A section through first valve 12a is shown in FIG. 3, the second and third valves 12b and 12c are similar in construction. The interior wall 17 of each valve forms a cylindrical cavity in the interior of each valve. First, second and third cylindrical switching chambers 22a, 22b and 22c, are rotatably housed within a respective cavity of each the first, second and third valve 12a, 12b and 12c respectively, traversing against the interior wall 17 of each valve as shown in FIG. 2. Each switching chamber 22a, 22b and 22c, includes a cylindrical mixing compartment 46 defined between a wall 48 and a cylindrical interior column 51. The interior column 51 traverses axially through the mixing compartments 46 of each switching chamber 22a, 22b and 22c. Second and third valves 12b and 12c further include a ceiling 52 having a bearing member 53 extending axially through the center of each valve ceiling 52 that provides a bearing surface for the interior column 51.

With reference back to FIG. 2 the first valve 12a of the present embodiment includes a first spindle 20a extending axially through the column 51 of mixing compartment 46 of switching chamber 22a. The spindle 20a is fixed to the column 51, such as for example by a friction fit that allows rotation of the first switching chamber 22a by the spindle 20a within the first valve 12a.

The second valve 12b includes a second spindle 20b extending axially through the column 51 of mixing compartment 46 of switching chamber 22b. The spindle 20b is attached to the column 51 of mixing compartment 46 of switching chamber 22b using the same method outlined above for the switching chamber 22a that allows rotation of the second switching chamber by the spindle 20b within the second valve 12b.

The third valve 12c includes a third spindle 20c extending axially through a column 51 of mixing compartment 46 of switching chamber 22c. The spindle 20c is attached to the column 51 of mixing compartment 46 of switching chamber 22c using the same method outlined above for the switching chamber 22b that allows rotation of the third switching chamber by the spindle 20c within the third valve 12c.

With reference to FIG. 3, a pair of apertures 30 is shown extending through switching chamber 22a through wall 48 and oriented 90 degrees to the other. Since all the valves 12a, 12b, and 12c are identical, switching chambers 22b and 22c of valves 12b and 12c include the identical apertures 30 extending through wall 48. Apertures 30 are arranged to align with openings 44 of ports 14a, 14b, 14c and 14d. The first pair of ports 14a and 14d openings 44 align with apertures 30 when a switching chamber 22a, 22b and 22c is rotated into a first switched position. The switching chamber 22a in FIG. 3 is shown in the first switched position that permits entry and exit of coolant fluid into mixing compartment 46. The second pair of ports 14b and 14c are blocked from the mixing compartment 46 by wall 48 blocking opening 44 of each port 14b and 14c. Rotation of the switching chamber 22a, 180 degrees places the switching chamber into a second switched position that causes alignment of openings 42 of the of the second pair of ports 14b and 14c with apertures 30 allowing entry and exit of coolant fluid into the mixing compartment 46 from the second pair of ports. The 180 degree rotation of the switching chamber 22a also causes coolant fluid from the first pair of ports 14a and 14b to be blocked from the mixing compartment 46 by wall 48. Each switching chamber 22a, 22b and 22c may be independently rotated by its associated spindle 20a, 20b and 20c respectively, to place each switching chamber into the first or the second switched position.

The first motion transfer stage 15a houses within a cavity 16a a subassembly of rotatable discs 18a and 18b. Disc 18a is connected to a portion of the first spindle 20a that extends through the bearing 53 into the cavity 16a. Rotation of spindle 20a rotates disc 18a when the first switching chamber 22a is rotated. Disc 18b is connected to the first end of the second spindle 20b and rides above the bearing member 52.

The second motion transfer stage 15b includes a subassembly of rotatable discs 18c and 18d located within a cavity 16b. Disc 18c is connected to the second spindle 20b on a second opposite end of spindle 20b. Rotation of disc 18b of the first motion transfer stage 15a causes rotation of the second switching chamber 22b and also rotation of disc 18c. Disc 18d is connected to the first end of the third spindle 20c. The rotation of disc 18d causes rotation of the third switching chamber 22c. The end cap 61 bearing member 64, receives the second end of the third spindle 20c within the bearing member 64 which rotationally supports the second end of the third spindle 20c.

FIG. 4 illustrates a sectional perspective view through the exemplary connector housing 80 of an embodiment of the disclosure. As shown, electrical terminals 72 extend from a receiving area 75 to the circuit board 74 where they are connected to electrical conductors that carry electrical signals to a rotation sensor 76 and voltage and current to the actuator motor 70. The rotation sensor 76 is coupled to spindle 20a and is arranged to convert rotational displacement of the spindle 20a such as when the actuator motor 70 rotates the first switching chamber 22a, to an electrical signal. The electrical signals produced by the rotational displacement of spindle 20a providing feedback signals to a motor controller (not shown) confirming that the actuator motor 70 responded to commanded activation signals transmitted to the actuator motor 70 by the motor controller. The electrical signals from the rotation sensor 76 and activation commands to the actuator motor 70 are coupled to the motor controller through electrical terminals 72. Electrical terminals 72 may also carry voltage and current to the actuator motor 70 to provide power to drive the actuator motor 70. The receiving area 75 of the connector housing is arranged to accept within receiving area 75 a suitable electrical connector (not shown) to electrically connect terminals 72 to a motor controller.

In order to prevent fluid leakage between the valves 12a, 12b and 12c and the motion transfer stages 15a and 15b to the exterior of the stacked valve assembly 10 elastomeric O-ring seals 110 may be placed between the walls of each core of the stacked valve assembly 10. Additionally, appropriately sized elastomeric O-ring seals 112 may be also placed between on interior walls of bearing members 53 and the spindles 20a, 20b and 20c to further fluidically isolate each motion transfer stage 15a, 15b from valves 12a, 12b and 12c. Additionally, each port opening 44 includes an elastomeric seal 114 to seal around apertures 30 when they align with port openings 44.

FIG. 5 illustrates an exemplary method of operation used by the stacked valve assembly 10 to provide switching of switching chambers 22a, 22b and 22c. In the illustration of FIG. 5 the drive section housing 11 and housings for the first, second and third valves 12a 12b, 12c and the housings for first and second motion transfer stages 15a and 15b and the end cap housing 61 have been removed to better illustrate the method of operation used in an embodiment of the present disclosure.

The actuator motor 70 is mechanically attached to an annular drive band 75 via a gear assembly 71. Gear assembly 71 consists of various toothed gear discs that mechanically couple the rotation of an actuator motor shaft 76 to the drive band 75. The drive band 75 is fixed to the exterior of an annular head portion 19 that extends axially from a top end of the first switching chamber 22a. The annular head portion 19 is integrally formed and joins wall 48 of the first switching chamber 22a. The rotation of motor shaft 76 of the actuator motor 70 is coupled via the gear assembly 71 to the gear band 75 which subsequently rotates the first switching chamber 22a. The actuator motor is arranged to receive electrical signals from an electrical connector to cause the motor actuator 70 to rotate motor shaft 76. Motor shaft 76 may rotate the first switching chamber 22a in a first direction C or a second direction D. The second direction D being opposite to the rotation of the first direction C.

Since disc 18a of the first motion transfer stage 15a is fixed to spindle 20a, rotation of switching chamber 22a by actuator motor 70 also causes rotation of disc 18a in the same rotational direction. Therefore, a rotation of switching chamber 22a in a first direction C causes disc 18a to rotate in the first direction C. A driving tab 100a extends downward from a peripheral edge of a bottom surface of disc 18a. Rotation of disc 18a causes driving tab 100a to rotate along with the disc 18a.

Disc 18b of the first motion transfer stage 15a is located in rotational alignment with disc 18a and includes a driven tab 100b that extends upward from a peripheral edge of a top surface of disc 18b. The driven tab 100b is in an alignment with driving tab 100a, whereby the driving tab 100a can engage the driven tab 100b. In the example shown in FIG. 5, a rotation in the first direction C of disc 100a would cause driving tab 100a to engage the driven tab 100b and rotate disc 18b in the first direction C. Since disc 18b is fixed to spindle 20b, the rotation of disc 18b by driving tab 100a would cause switching chamber 22b to rotate in the first direction C for the same arc length as the first switching chamber 22a.

However, if the actuator motor 70 rotates the first switching member 22a in the second direction D, driving tab 100a would not engage the driven tab 100b until approximately 360 degree of rotation of disc 18a occurs. When the driving tab 100a engages driven tab 100b in the second direction D, disc 18b will also be rotated in the second direction D causing switching chamber 22b to rotate in the second direction D for the same arc length as the first switching chamber 22a, however 360 degrees of arc length farther.

Disc 18c of the second motion transfer stage 15b is fixed to spindle 20b and includes a driving tab 100c extending downward from a peripheral edge of a bottom surface of disc 18c. Rotation of disc 18b causes spindle 20b to rotate disc 18c in the same direction, that is, when disc 18b is rotated in the first direction C disc 18c follows the rotation of disc 18b causing driving tab 100c of disc 18c to rotate along with the disc 18b. Disc 18d of the second pair of discs includes a driven tab 100d that extends upward from a peripheral edge of a top surface of disc 18d. Rotation of disc 18c in the first direction would cause driving tab 100c to engage the driven tab 100d and rotate disc 18d in the first direction C that consequently rotates the switching chamber 22c in the first direction C.

Rotation of disc 18c in the second direction D, would not engage the driven 100d with driving tab 100c until approximately 360 degree of rotation of disc 18c occurs. When the driving tab 100c finally engages driven tab 100d in the second direction D, disc 18c would also be rotated in the second direction D causing switching chamber 22c to rotate in the second direction D for the same arc length as the second switching chamber 22b, however 360 degrees of arc length farther. Therefore, two complete rotations of the switching chamber 22a is required before the driven tab 100d of the disc 18d is engaged by the driving tab 100c before rotation of the switching chamber 22c occurs. The first and second directional rotations of the motion transfer stages 15a and 15b can be used much like a "combination" lock mechanism to place each switching chamber 22a, 22b and 22c of each valve 12a, 12b and 12c, respectively into the first or the second switched position based on a combination of rotational movements of a single actuator.

The exemplary method explained in the embodiment above uses driving tabs positioned to either directly engage and drive driven tabs in a first direction, or a 360 degree of rotational movement of the driven tab to engage the driving tab in a second direction. It will be appreciated by those skilled in the art that the driving tabs and driven tabs may be reversed. For example, the driving tab may be positioned to engage the driven tab directly in the second direction and a 360 degree rotation in the first direction to engage the driven tab by the driving tab.

FIGS. 6A-6C, 7A-7C, 8A-8C and 8A-9C illustrate diagrammatically another embodiment of the method of operation the present disclosure that may be used to operate and switch fluid flow through the switching chambers of the stacked valve assembly 10 using only a single actuator. The method will be described using three independent rotatable discs 180a, 180b and 180c arranged in either a vertical or horizonal stack. It will be appreciated that four discs may also be used to cause the switching as was taught and shown in FIG. 5. Each rotatable disc 180a, 180b and 180c is associated with a switching chamber 122a, 122b and 122c of a valve 12a, 12b and 12c, respectively. Valves 12a, 12b and 12c are also arranged either in a vertical or horizontal stack.

Each valve 12a, 12b and 12c includes four ports 114a, 114b, 114c and 114d arranged along an external surface of each switching chamber 122a, 122b and 122c. Each port 114a, 114b, 114c and 114d may be connected to a pipeline carrying coolant fluid in one or more coolant circuits. An annular wall 148 of each switching chamber 122a, 122b and 122c includes a first and a second aperture 130 located 90 degrees to the other that penetrate through wall 148. The annular wall 148 is arranged to rotate about a spindle 120*a*. Rotation of the wall 148 causes the first and the second apertures to align with two of the four ports to allow coolant fluid to flow into and out of a mixing chamber 146.

Figures 6A, 6B, 6C:
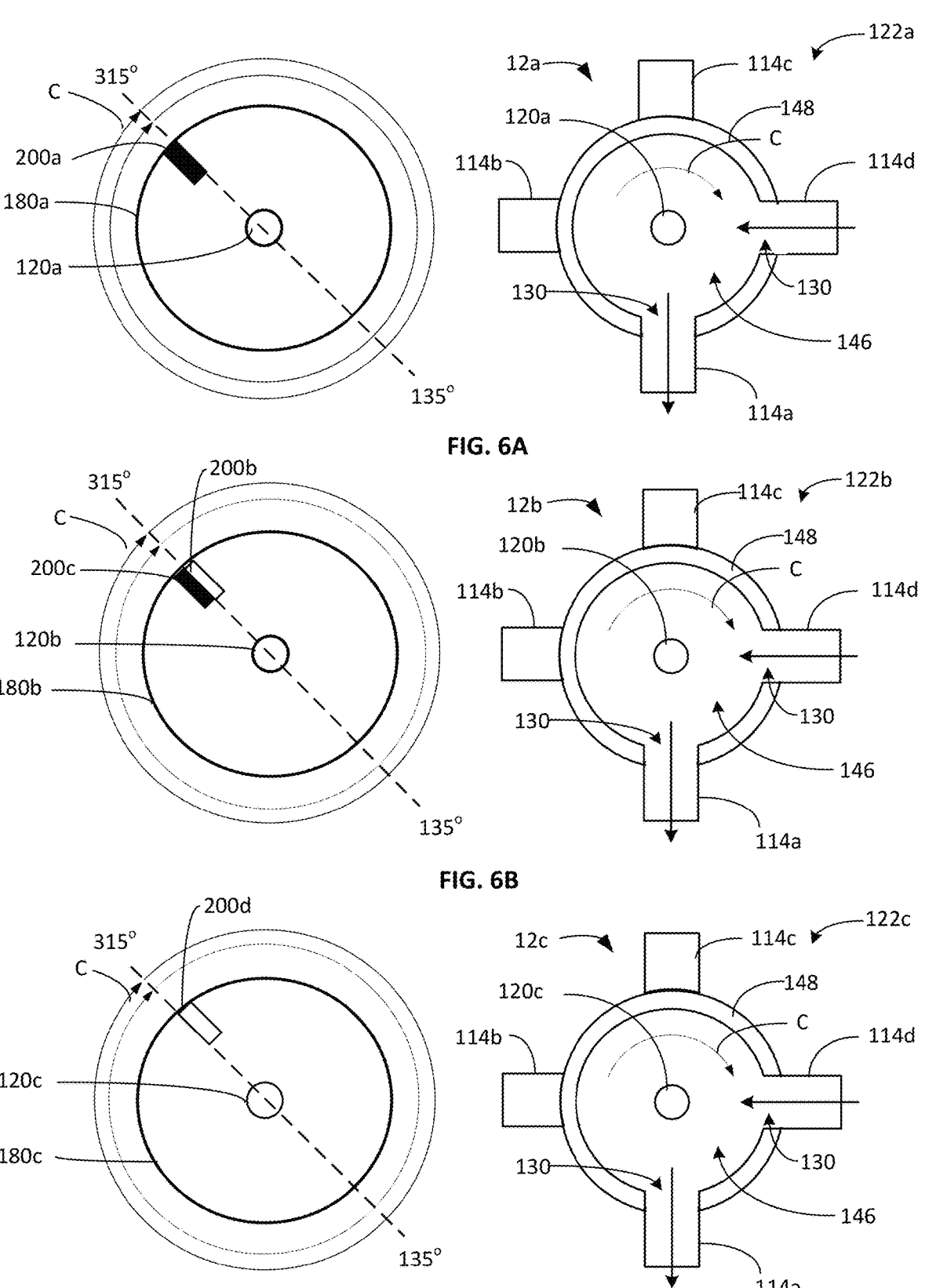
FIG. 6A is diagrammatic representation of the switched position of a first valve switching chamber and position of a first disc in a set orientation after two rotations in a first direction of the first disc for one embodiment of the operation method of the present invention.
FIG. 6B is diagrammatic representation of the switched position of a second valve switching chamber and position of a second disc in a set orientation after two rotations in a first direction of the first disc for one embodiment of the operation method of the present invention.
FIG. 6C is diagrammatic representation of the switched position of a third valve switching chamber and position of a third disc in a set orientation after two rotations in a first direction of the first disc for one embodiment of the operation method of the present invention.

As shown in FIG. 6A for valve 12*a*, ports 114*a* and 114*d* form a first pair of ports. In the first pair of ports, port 114*d* acts as the input port and 114*a* acts as the output port. Fluid flows from port 114*d* through the first aperture 130 and into a mixing compartment 146 and out of the mixing compartment 146 through the second aperture 130 and out of output port 114*a*. It should be noted that the selection of the input port and output port is arbitrary, and each can act as the other and the ports used in this embodiment as the input and output ports have been chosen only to simplify the explanation of the method of the illustrated embodiment. When the first and second apertures 130 align with ports 114*a* and 114*d*, ports 114*b* and 114*c* are blocked from mixing compartment 146 by wall 148.

Openings 130 can be switched to align with ports 114*b* and 114*c* to form a second pair of ports. A 180 degree rotation of annular wall 148 places first and second openings 130 in alignment with ports 114*b* and 114*c* permitting fluid to flow into and out of the mixing compartment 146 through ports 114*b* and 114*c*, respectively. Ports 114*a* and 114*d* are blocked from mixing compartment 146 by wall 148. Switching chambers 122*b* and 122*c* of valves 12*b* and 12*c* operate in the same manner as explained for switching chamber 122*a* of valve 12*a*.

The first valve 12*a* is coupled to the actuator motor 70 by a rotatable spindle 120*a*. Spindle 120*a* rotates wall 148 of the first switching chamber 122*a* and annular disc 180*a* concurrently. For example, a 180 degree rotation of the spindle 120*a* by actuator motor 70 causes wall 148, and disc 180*a* to both rotate 180 degrees.

A driving tab 200*a* extends from a peripheral edge of disc 180*a*. The driving tab 200A is lined-up with a driven tab 200*b* located on disc 180*b* associated with second valve 12*b*. In the geometry of the present exemplary embodiment, discs 180*a*, 180*b* and 180*c* are shown divided into two 180 degree quadrants bisected by radians at 135 and 315 degrees. In the present embodiment, rotations of less than 180 degrees will not be used to accomplish switching. However, it will be appreciated that rotational movements of less than 180 degrees may be used in other alternate geometries to perform switching by the valves.

The second valve 12*b* is associated with a disc 180*b*. Disc 180*b* includes a driven tab 200*b* extending from a peripheral edge of disc 180*b*. The driven tab 200*b* is in alignment with the driving tab 200*a* of disc 180*a*. Disc 180*b* is fixed to and drives a rotatable spindle 120*b*, that is independent of and separate from spindle 120*a*. Disc 180*b* rotates when the driving tab 200*a* engages the driven tab 200*b* and is pushed by the driving tab 200*a*. Rotation of disc 180*b* by driving tab 200*a* causes wall 148 of switching chamber 122*b* to be rotated by spindle 120*b* and align the first and second openings 130 with ports 114*a*, 114*b* 114*c* and 114*d* of switching chamber 122*b*. Disc 180*b* further includes a driving tab 200*c* extending from a peripheral edge of disc 180*b* on a side opposite of the driven tab 200*b*. The driving tab 200*c* is in alignment with a driven tab 200*d* of disc 180*c*.

Disc 180*c* is fixed to and drives a spindle 120*c*. Spindle 120*c* is also independent of and separate from spindles 120*a* and 120*b*. The rotation of disc 180*c* rotates only when driving tab 200*c* of disc 180*b* engages driven tab 200*d* and is pushed by driving tab 200*c*. The rotation of disc 180*c* by driving tab 200*c* causes wall 148 of switching chamber 122*c* to be rotated by spindle 120*c* and align first and second openings 130 with the ports 114*a*, 114*b* 114*c* and 114*d* of switching chamber 122*c*.

All of the valves 12*a*, 12*b* and 12*c* are initially placed in a set orientation into a first switched position. The rotation of spindle 120*a* by the actuator motor 70 in first direction C for at least two 360 degree rotations and stopping the rotations at the 315 degree radian would place the first, second and third valves 12*a*, 12*b* and 12*c* in the first switched position. For the two 360 degree rotations in the first direction C, driving tabs 200*a* and 200*c* would engage their associated driven tab 200*b* and 200*d*, no matter where the driven tabs 200*b* and 200*d* are located on their respective discs 180*b* and 180*c*. The two 360 degree rotations in the first direction C would engage each driven tab 200*b* and 200*d* by a driving tab 200*a* and 200*c* to locate all of the driving tabs and driven tabs at the 315 degree radian. As discs 180*a*, 180*b* and 180*c* are rotated, wall 148 of each switching chambers 122*a*, 122*b* and 122*c* is also rotated in the first direction C. At the 315 degree radian each switching chamber 122*a*, 122*b* and 122*c* of valves 12*a*, 12*b* and 12*c* respectively, is placed in the first switched position. In the first switched position the first and second apertures 130 align with ports 114*d* and 114*a* and ports 114*b* and 114*c* are blocked by their respective wall 148.

Figure 7A:
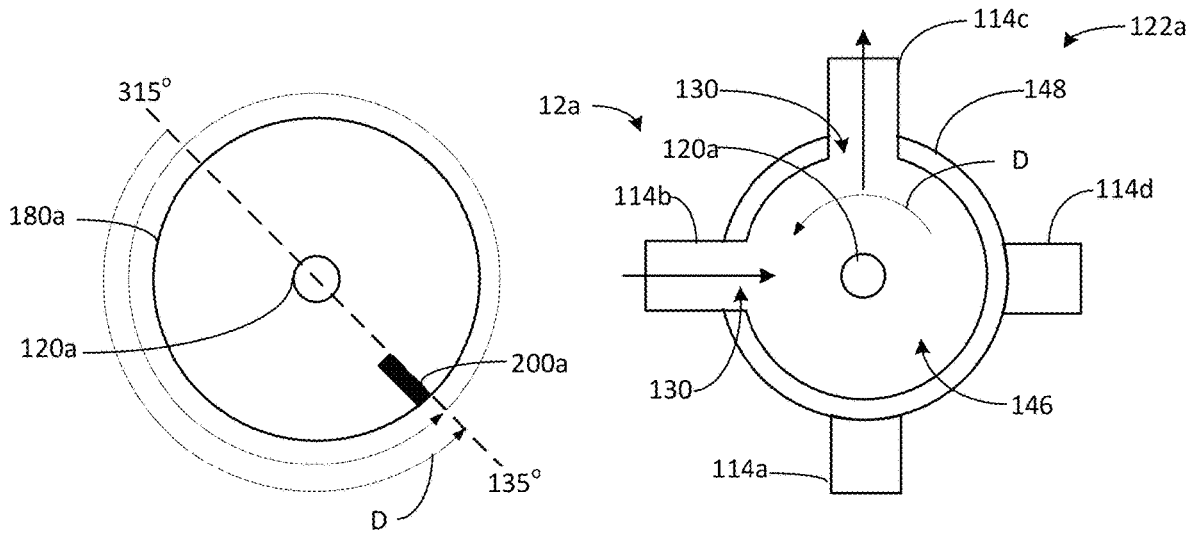
FIG. 7A is diagrammatic representation of the switched position of the first valve switching chamber and position of the first disc after a greater than one rotation of the first disc in a second direction from the set orientation of FIG. 6A for one embodiment of the operation method of the present invention.
Figure 7B:
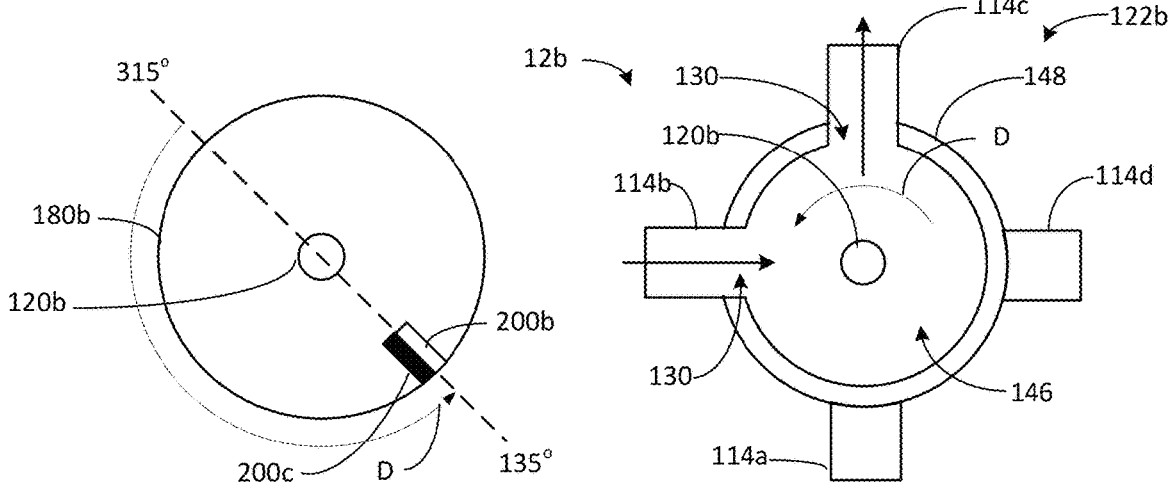
FIG. 7B is diagrammatic representation of the switched position of the second valve switching chamber and position of the second disc after a greater than one rotation of the first disc in the second direction for one embodiment of the operation method of the present invention.
Figure 7C:
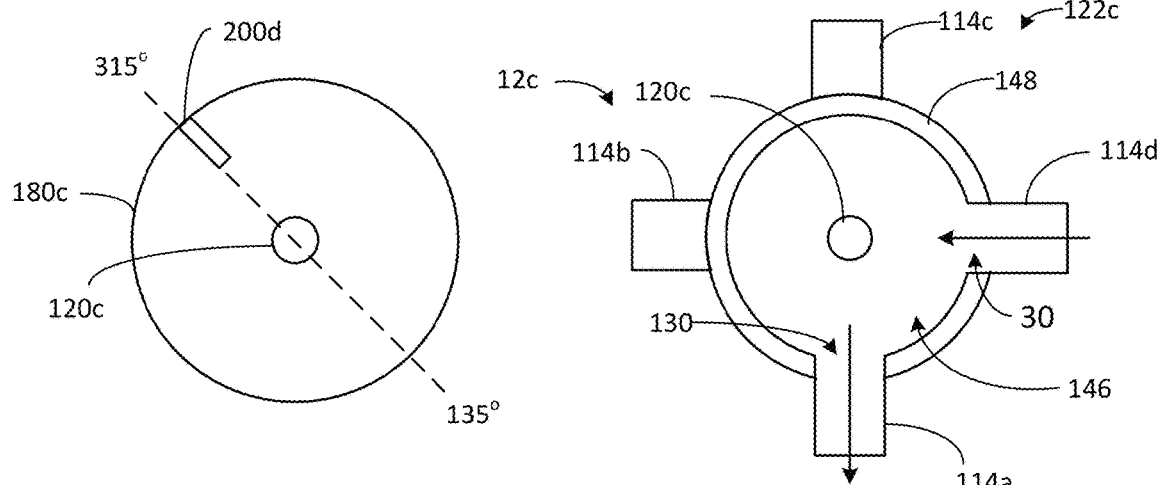
FIG. 7C is diagrammatic representation of the switched position of the third valve switching chamber and position of the third disc after a greater than one rotation of the first disc in the second direction for one embodiment of the operation method of the present invention.

FIGS. 7A-7C illustrate the switch positions for the first, second and third valves 12*a*, 12*b* and 12*c* for a greater than one 360 degree rotation of disc 180*a* from the set orientation shown at FIG. 6A, in the second direction D. Upon rotation of spindle 120*a* by actuator motor 70 for a 360 degree rotation plus an additional 180 degree rotation in the second direction D, driving tab 200*a* is placed at the 135 degree radian of disc 180*a*. This causes wall 148 of the first switching chamber 122*a* to be rotated in the second direction D to assume the second switched position. In the second switched position the first and the second openings 130 align with ports 114*b* and 114*c* and ports 114*a* and 114*d* are blocked by wall 148.

The rotation in the second direction D of driving tab 200*a* does not engage driven tab 200*b* of disc 180*b* until a full 360 degree rotation of disc 180*a* occurs. Since in the set orientation of FIG. 6B the driven tab 200*b* was located at the 315 degree radial an additional 180 degree rotation in the second direction D would move driven tab 200*b* by driving tab 200*a* to the 135 degree radial. At the 135 degree radial, wall 148 of switching chamber 122*b* of valve 12*b* is rotated in the second direction D by disc 180*b* to also assume the second switched position.

Since a complete 360 degree rotation in the second direction D of disc 180*b* is required to have driving tab 200*c* engage driven tab 200*d*, the 180 degree rotation in the second direction D by disc 180*b* would not engage driven tab 200*d* by driving tab 200*c* and valve 12*c* remains in the first switched position. Therefore, for a greater than a 360 degree rotation in a second direction from the set orientation, the first and second valve 12*a* and 12*b* would be positioned in the second switched position and the third valve 12*c* in the first switched position.

Figure 8A:
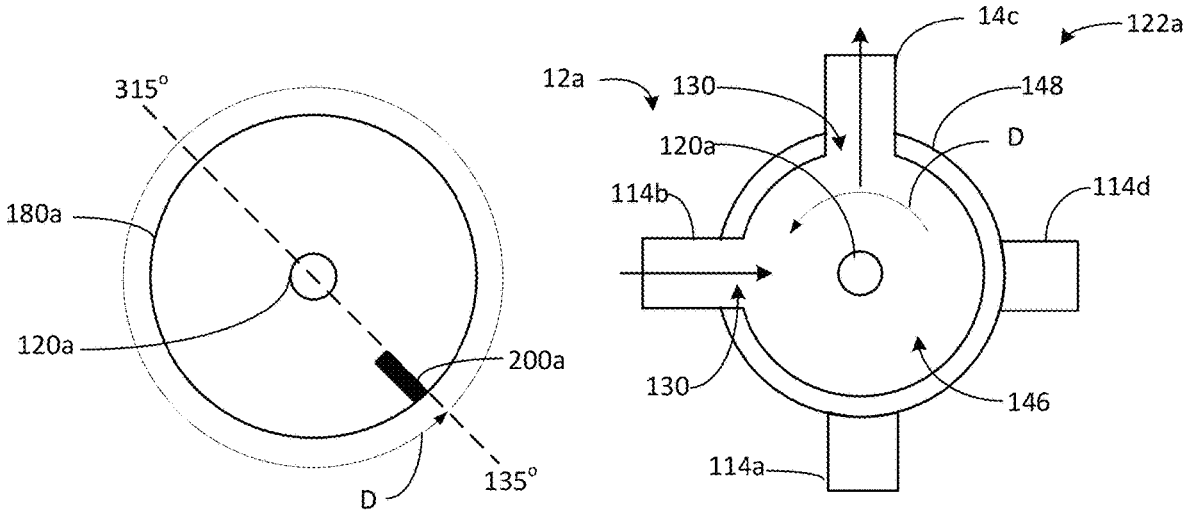
FIG. 8A is diagrammatic representation of the switched position of the first valve switching chamber and position of the first disc after one rotation of the first disc in the second direction from the first disc orientation shown in FIG. 7A for one embodiment of the operation method of the present invention.
Figure 8B:
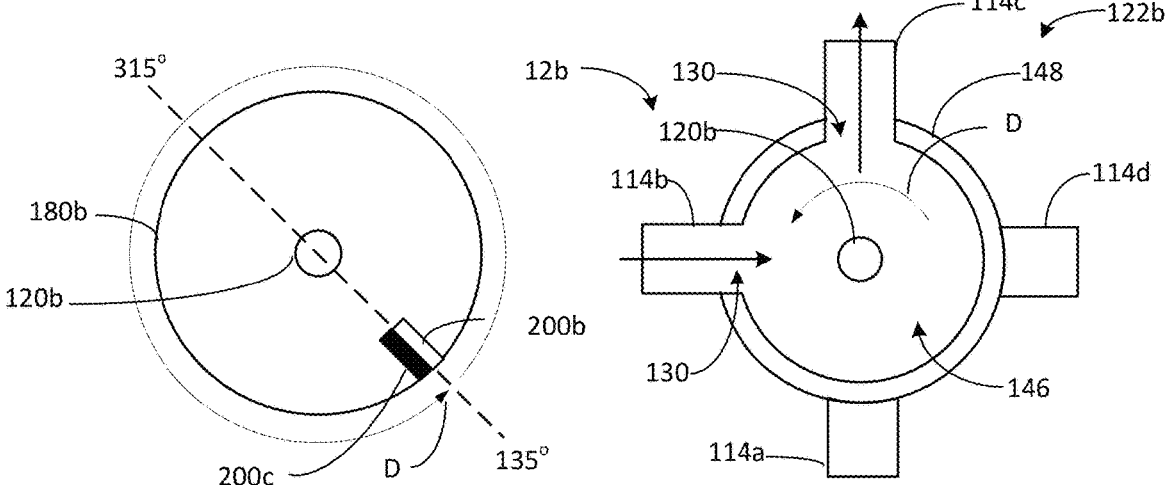
FIG. 8B is diagrammatic representation of the switched position of the second valve switching chamber and position of the second disc after one rotation of the first disc in a second direction from the first disc orientation shown in FIG. 7A for one embodiment of the operation method of the present invention.
Figure 8C:
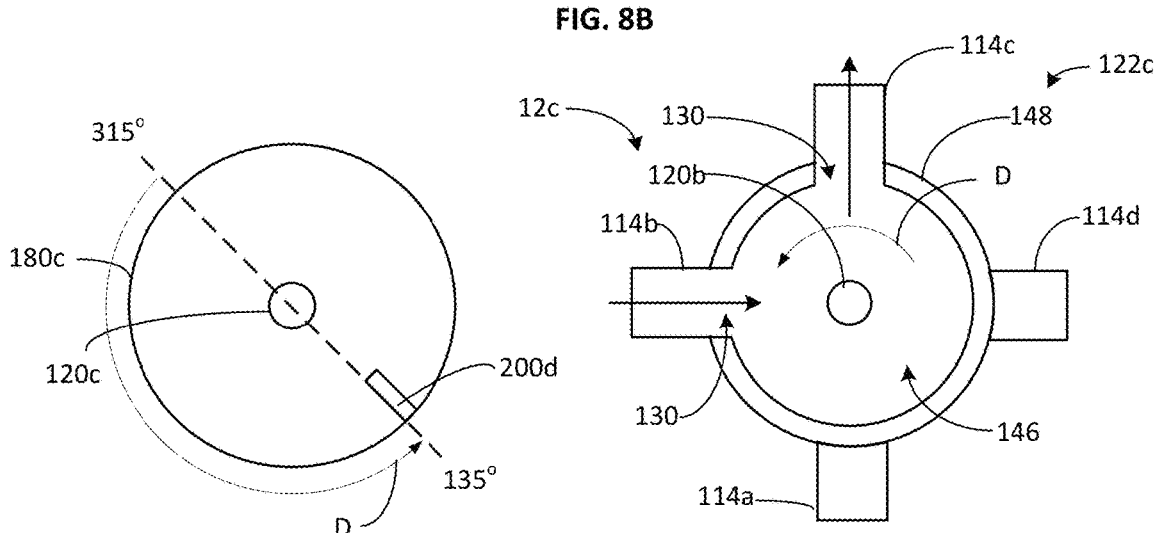
FIG. 8C is diagrammatic representation of the switched position of the third valve switching chamber and position of a third disc after one rotation of the first disc in a second direction from the first disc orientation shown in FIG. 7A for one embodiment of the operation method of the present invention.

FIGS. 8A-8C illustrate the switched positions for the first, second and third valves 12*a*, 12*b* and 12*c* for an additional 360 degree rotation of disc 180*a* from the positions of FIGS. 7A-7C, in the second direction D. One additional rotation of disc 180*a* and 180*b* stopping at the 135 degree radian would retain the first valve 12*a* and the second valve 12*b* in the second switched position However, the additional rotation in the second direction D would engage driven tab 200*d* by driving tab 200*c* of disc 180*b* thereby moving the driven tab of disc 180*c* to the 315 degree radian and causing valve 12*c* to be rotated in the second direction D by disc 180*c* and into the second switched position. The additional 360 degree rotation in second direction D now place the first, second and the third valves 12*a*, 12*b* and 12*c*, in the second switched position.

Figure 9A:
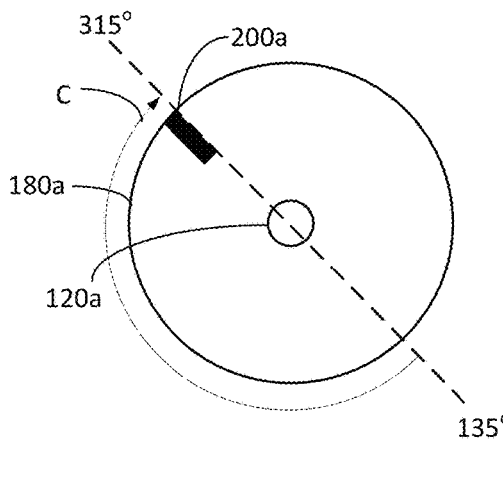
FIG. 9A is diagrammatic representation of the switched position of the first valve switching chamber and position of a first disc after a less than one rotation of the first disc in a first direction from the first disc orientation shown in FIG. 8A for one embodiment of the operation method of the present invention.
Figure 9A:
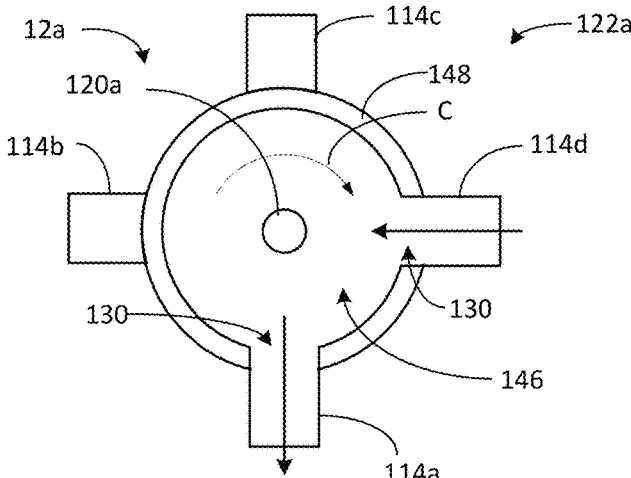
Figure 9B:
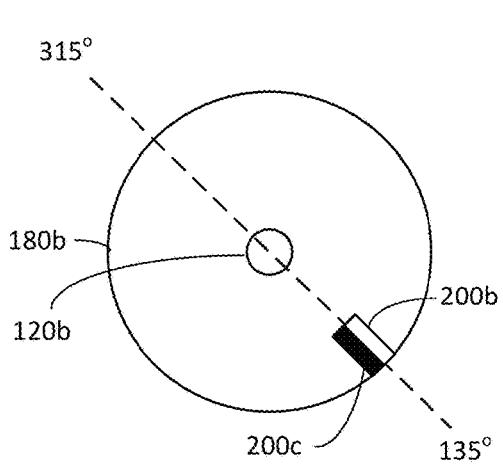
FIG. 9B is diagrammatic representation of the switched position of a second valve switching chamber and position of a second disc after a less than one rotation of the first disc in the first direction from the first disc orientation shown in FIG. 8A for one embodiment of the operation method of the present invention.
Figure 9B:
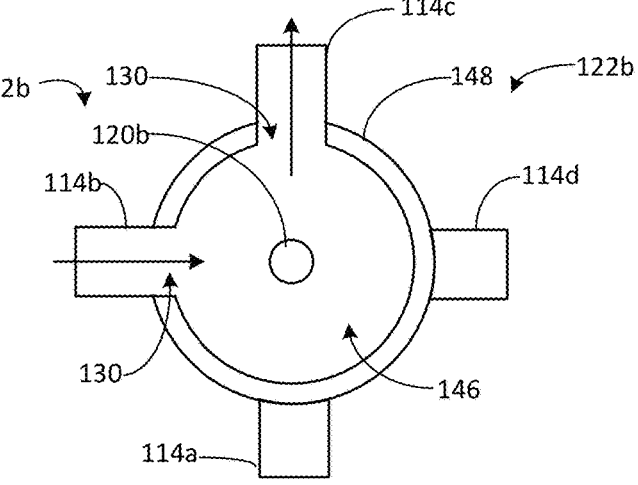
Figure 9C:
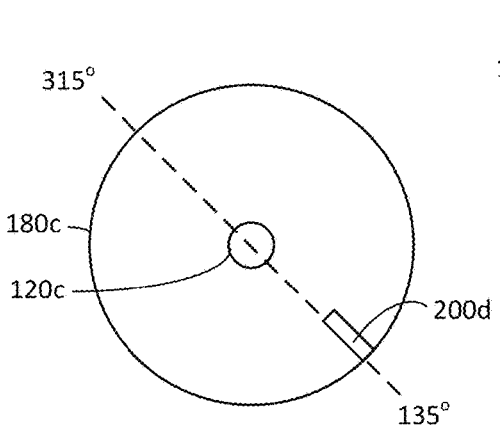
FIG. 9C is diagrammatic representation of the switched position of a third valve switching chamber and position of the third disc after a less than one rotation of the first disc in a first direction from the first disc orientation shown in FIG. 8A for one embodiment of the operation method of the present invention.
Figure 9C:
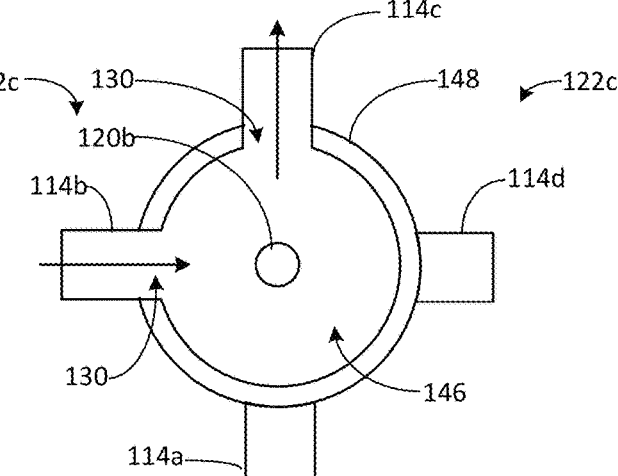

FIGS. 9A-9C illustrate the switched positions for the first, second and third valves 12*a*, 12*b* and 12*c* for a less than a 360 rotation of disc 180*a* from the positions of FIGS. 8A-8C, in the first direction C. A 180 degree rotation of spindle 120A in direction C by the actuator motor 70, places the driving tab 200*a* at the 315 degree radian to the first valve 12*a* to rotate in the first direction C and assume the first switched position. The less than one full 360 degree rotation of disc 180*a* would fail to engage driven tab 200*b* by driving tab 200*a* and driven tab 200*b* by driving tab 200*c*. The driven tab 200*d* of disc 180*c* would remain at the 135 degree radial retaining the second valve 12*b* and third valve 12*c* in the second switched position. A less than a 360 degree rotation of disc 180*a* in the first direction C from the orientation of FIG. 8A would place the first valve 12*a* in the first switched position and retain the second and third valves 12*b* and 12*c* in the second switched position.

Two 360 rotations of disc 180A in the first direction C stopping the rotation at the 315 degree radial would again place all the valves into the set orientation shown in FIGS. 6A-6C. From the set orientation the discs can be rotated by specific rotations, i.e., one, less than one, greater than one in various combinations in either the first or the second direction to set one or more of the valves in either a first or second switched position.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a first valve having at least one input port and at least one output port the first valve movable into at least one of a plurality of switched positions;
a drive section coupled to the first valve arranged to move the first valve into at least one of the plurality of switched positions;
a second valve fluidically isolated from the first valve having at least one input port and at least one output port the second valve movable into at least one of a plurality of switched positions;
a first tab coupled to the first valve;
a second tab coupled to the second valve, wherein the moving of the first valve by the drive section engages the first tab with the second tab causing movement of the second valve into one of the plurality of switched positions and;
a first spindle coupled to the drive section attached to the first valve and to a first disc and the first tab is attached to the first disc, wherein the drive section moves the first valve into at least one of the plurality switched positions that transfers the movement of the first valve to the first disc that moves the first tab to a position that corresponds to the at least one switched position of the first valve.

2. The apparatus of claim 1, wherein the second valve is attached to a second spindle and to a second disc and the second tab is attached to the second disc, wherein the movement of the first valve by the drive section into at least one of the plurality switched positions transfers the movement of the first tab of the first disc to the second tab of the second disc placing the second valve into one of the plurality of switched positions.

3. The apparatus of claim 2, wherein the drive section is arranged to move the first valve and the first spindle into a first or second direction for a first or a second distance.

4. The apparatus of claim 3, wherein the movement of the first valve in the first direction for the first distance causes the first tab of the first disc to move and engage the second tab on the second disc and place the first and the second valve into one of the plurality of switched positions.

5. The apparatus of claim 3, wherein movement of the first valve in the second direction for the second distance causes the first tab of the first disc not to engage the second tab of the second disc.

6. The apparatus of claim 3, wherein the movement of the first valve in the second direction for the second distance places the first valve in one of the plurality of switched positions different from the one of the plurality of switched positions of the second valve.

7. The apparatus of claim 3, wherein the second direction is opposite to the first direction and the movement is a rotational motion, wherein the first distance is equal to or greater than a 360 degree rotational motion around an axis and the second distance is less than a 360 degrees rotational motion around the axis.

8. A stacked valve system comprising:

a first valve having at least one input port and at least one output port movable into at least one of a plurality of switched positions;

a drive section having an actuator coupled to the first valve, the actuator arranged to move the drive section and the first valve into at least one of the plurality of switched positions;

a first spindle coupled to the drive section and to the first valve;

a second valve fluidically isolated from the first valve having at least one input port and at least one output port movable into at least one of a plurality of switched positions;

a second spindle coupled to the second valve;

a motion transfer stage located between the first valve and the second valve;

a third valve fluidically isolated from the first and the second valve having at least one input port and at least one output port movable into at least one of a plurality of switched positions;

one other motion transfer stage located between the second valve and the third valve the other motion transfer stage coupling the movement of the second valve to the third valve, wherein the moving of the first valve by the actuator causes movement of the third valve into one of the plurality of switched positions;

a first driving part contained in the motion transfer stage coupled to the first spindle, wherein the drive section moves the first valve into at least one of the plurality of switched positions that transfers the movement of the first valve to the first spindle and to the first driving part; and a second driving part contained in the other motion transfer stage and a first driven part contained in the motion transfer stage coupled to the second spindle, wherein the movement of the first valve by the drive section into at least one of the plurality of switched positions transfers the movement of the first valve to the first driven part by the first driving part and to the second spindle that moves the second driving part and the second valve into one of the plurality of switched positions.

9. The system of claim 8, wherein the system further comprises:

a third spindle coupled to the third valve; and a second driven part contained in the one other motion transfer stage coupled to the third spindle, wherein the movement of the second valve transfers the movement of the second valve to the second driven part by the second driving part and to the third spindle that moves the third valve into one of the plurality of switched positions.

10. The system of claim 9, wherein the actuator moves the drive section, the first valve, and the first spindle into a first or a second direction for a first or a second distance.

11. The system of claim 10, wherein:

the first and second driving parts engage and move the first and second driven parts and place the first the second and third valves into one of the plurality of switched positions when the first valve is moved by the actuator in the first direction for the first distance;

the first and second driving parts do not engage the first and second driven parts for movement of the first valve by the actuator in the second direction for the second distance; and movement by the actuator in the second direction for the second distance places the first valve in one of the plurality of switched positions different from the at least one of the plurality of switched position of the second and third valves.

12. The system of claim 10, wherein the second direction is opposite to the first direction and the movement is a rotational motion, wherein the first distance is equal to or greater than a 360 degrees rotational motion around an axis and the second distance is less than a 360 degree rotational motion around the axis.

* * * * *